June 12, 1962 E. J. BRAUNER 3,039,067

Q MULTIPLIER CIRCUIT

Filed Sept. 9, 1959 3 Sheets-Sheet 1

INVENTOR
Edward J. Brauner
BY Isidore Match
ATTORNEY

INVENTOR
Edward J. Brauner
BY Isidore Match
ATTORNEY

June 12, 1962 E. J. BRAUNER 3,039,067

Q MULTIPLIER CIRCUIT

Filed Sept. 9, 1959 3 Sheets-Sheet 3

INVENTOR
Edward J. Brauner
BY Isidore Match
ATTORNEY

United States Patent Office 3,039,067

Patented June 12, 1962

3,039,067

Q MULTIPLIER CIRCUIT

Edward J. Brauner, Lynchburg, Va., assignor to General Electric Company, a corporation of New York Filed Sept. 9, 1959, Ser. No. 838,933
19 Claims. (Cl. 331—117)

This invention relates to Q multiplier circuits. More particularly, it relates to an improved Q multiplier circuit capable of being adapted for either the selective amplifier or oscillator mode of operation.

A "Q multiplier" is an electronic device that boosts the Q of a tuned circuit many times beyond its normal value. In this condition, the single tuned circuit has much greater selectivity than normal, and it can be utilized to reject or amplify a narrow band of frequencies.

In known Q multiplier circuits wherein an active element having an input and an output is included in the circuit, an inductor in circuit with the input to the active device is also connected to the output thereof through an appropriate feedback network. Generally, regenerative feedback is employed, the feedback being accomplished through a resistor in circuit with the output of the device and the inductor. Such feedback reduces the effective resistance of the inductor thereby effectively multiplying its Q. The greater the degree of regenerative feedback, the greater is the amount Q multiplication. Since a point may be reached where the amount of regenerative feedback causes instability in the circuit, the degree of feedback is limited to a given maximum value.

In the event that it is desired to multiply the Q of a selective amplifier circuit wherein a capacitor is employed to resonate the inductor, a similar feedback arrangement is employed. Here again, care must be taken to control the degree of regenerative feedback whereby it does not produce oscillation.

Where a resonant circuit is included in the input to the active device in the circuit and it is desired to multiply the Q thereof to utilize the circuit in both the selective amplifier and oscillator modes of operation, such dual utilization is accomplished by controlling the regenerative feedback below the maximum degree required to maintain stability and to exceed such maximum where oscillation is desired. The degree of feedback varies inversely with the value of the feedback resistor.

In such dual operation, it has been found that when a Q multiplier is adapted to be utilized in both the selective amplifier and oscillator modes of operations, the frequency of operation of the circuit is higher when the circuit is utilized as an oscillator. Furthermore, when the circuit is utilized as an oscillator, there is a given period which is required before the output voltage of the oscillator attains its final value. Also, when the circuit is utilized as an oscillator, its output voltage varies with variations in the supply voltage. In this latter connection, the oscillator output voltage also may vary in response to changes in the operating characteristics of circuit components, especially semiconductor devices.

Where a Q multiplier circuit is adapted to be utilized in both the selective amplifier and oscillator modes of operation, switching means is required to effect such adaptation. The switching means that is required is either a double pole, single throw switch or relay. Both of these devices present many disadvantages.

Where such a switch is utilized, it has to be mounted close to the Q multiplier circuit as leads of appreciable length degrade the operation of the circuit. Since both contacts of such switch are high impedance points within the circuit, a high quality switch is required. Also, any stray capacitance between the switch contacts and ground affect both the selective amplifier and oscillator modes of operations of the Q multiplier circuit. Consequently, shielded leads with a fixed capacitance to ground such as coaxial cable which is large and bulky, is needed to connect the switch contacts in the circuit.

If a relay is utilized as the switching means in the circuit, there are presented the problems of relay reliability and current drain. A high quality and therefore costly relay is needed.

It is, accordingly, an object of this invention to provide an improved Q multiplier circuit adapted to be operated in both the selective amplifier and oscillator modes of operation.

It is a further object to provide a Q multiplier circuit in accordance with the preceding object wherein the operating frequency in both modes of operation is substantially the same.

It is another object to provide a Q multiplier circuit in accordance with the preceding objects wherein variation in output voltage of the circuit when it is operated as an oscillator due to variations in the supply voltage are substantially minimized.

It is still another object to provide a Q multiplier circuit in accordance with the preceding objects wherein the time for the output voltage to attain its final value when the circuit is operated as an oscillator is substantially decreased.

It is yet another object to provide a Q multiplier circuit in accordance with the preceding objects wherein variations in circuit operation due to variations in the operation of components of the circuit due to temperature changes are substantially compensated for.

It is another object to provide a Q multiplier circuit in accordance with the preceding objects wherein the switching means required for changing the circuit from one of its modes of operation to its other mode of operation includes a simple single pole switch to selectively switch the circuit from the selective amplifier to the oscillator mode of operation and vice versa.

Generally speaking and in accordance with the invention, there is provided a Q multiplier circuit capable of being operated in both the selective amplifier and oscillator modes of operation. The circuit includes an active device having an input and an output and a tank circuit in circuit with its input. Means are provided for selectively regeneratively feeding back a first portion of the output of the active device to effect Q multiplication of the tank circuit, the first portion having a value whereby the Q multiplier circuit functions as a selective amplifier and for regeneratively feeding back a second portion of one output of the active device to the tank circuit to cause Q multiplication thereof, the second portion having a value whereby the Q multiplier circuit functions as an oscillator. The foregoing means comprises a first resistance connected between the output of the active device and the tank circuit, a parallel combination of a second resistance and a capacitance and means for switching the parallel combination into parallel arrangement with the first resistance. The value of the capacitance is so chosen whereby the operating frequency of operation of the Q multiplier circuit in both modes of operation is substantially the same.

The features of this invention which are believed to be new are set forth with particularity in the appended claims. The invention itself, however, may best be understood by reference to the following description when taken in conjunction with the accompanying drawings which show embodiments of a Q multiplier circuit according to the invention.

Figure 3:
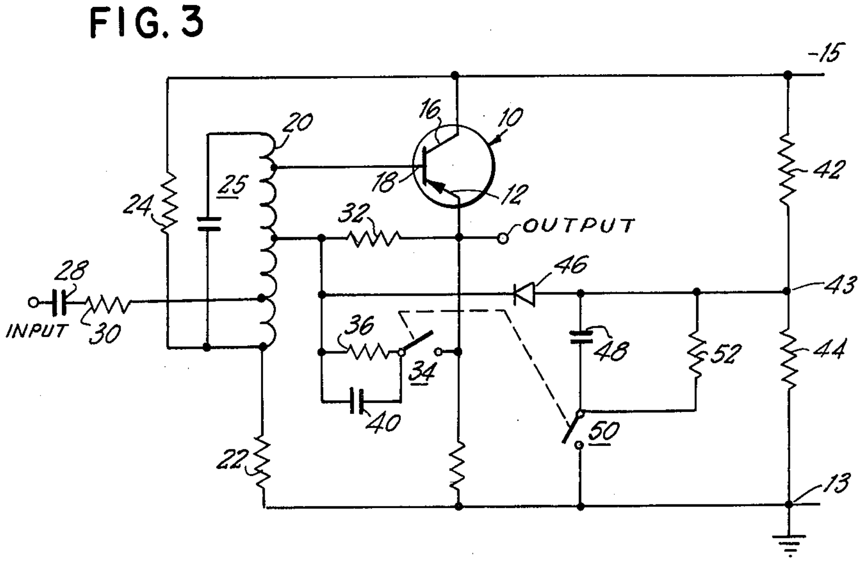
Figure 5:
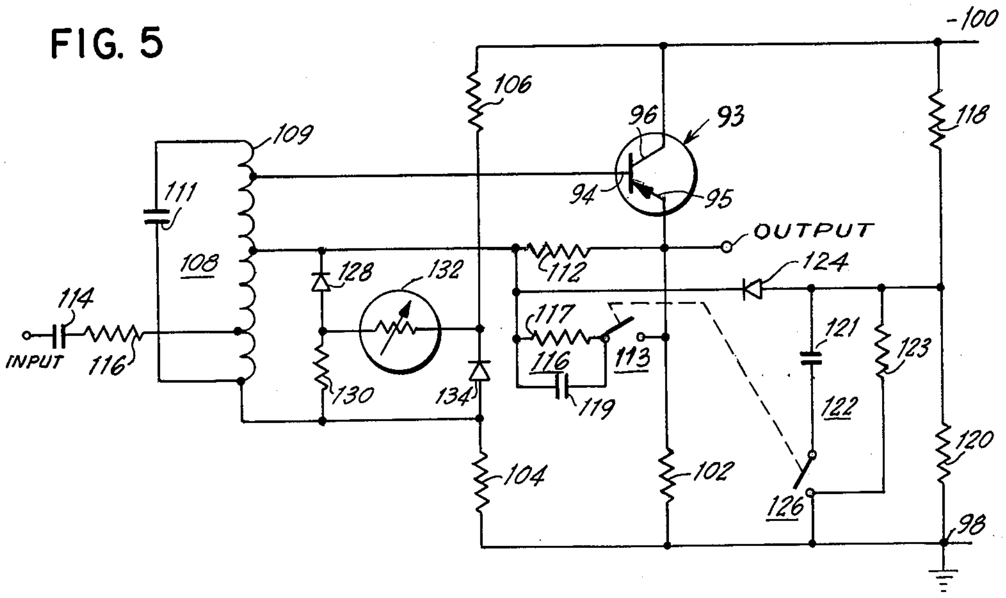
Figures 4, 6:
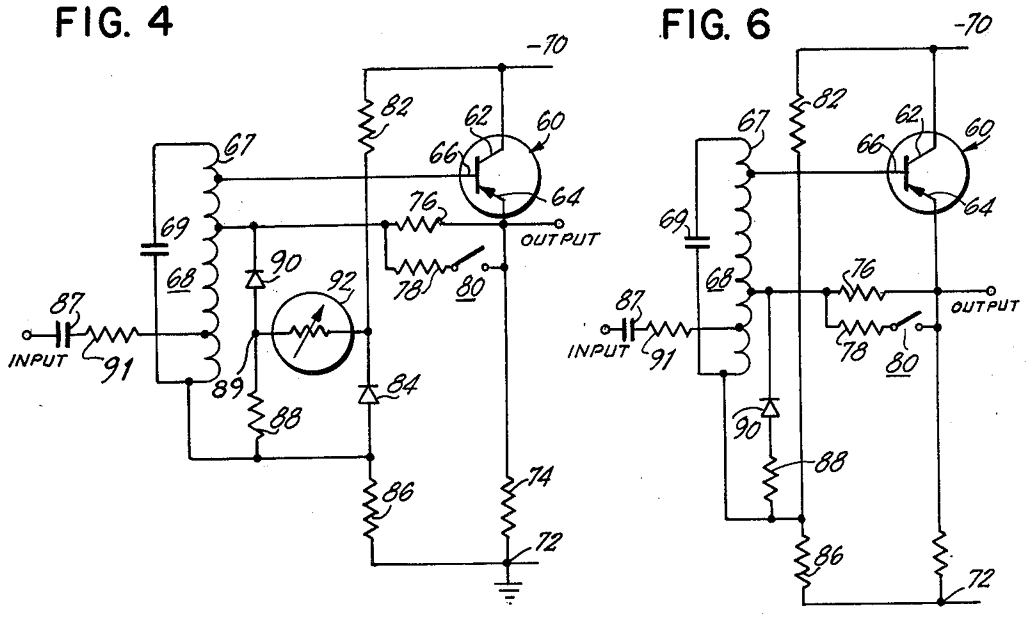
Figures 7, 8:
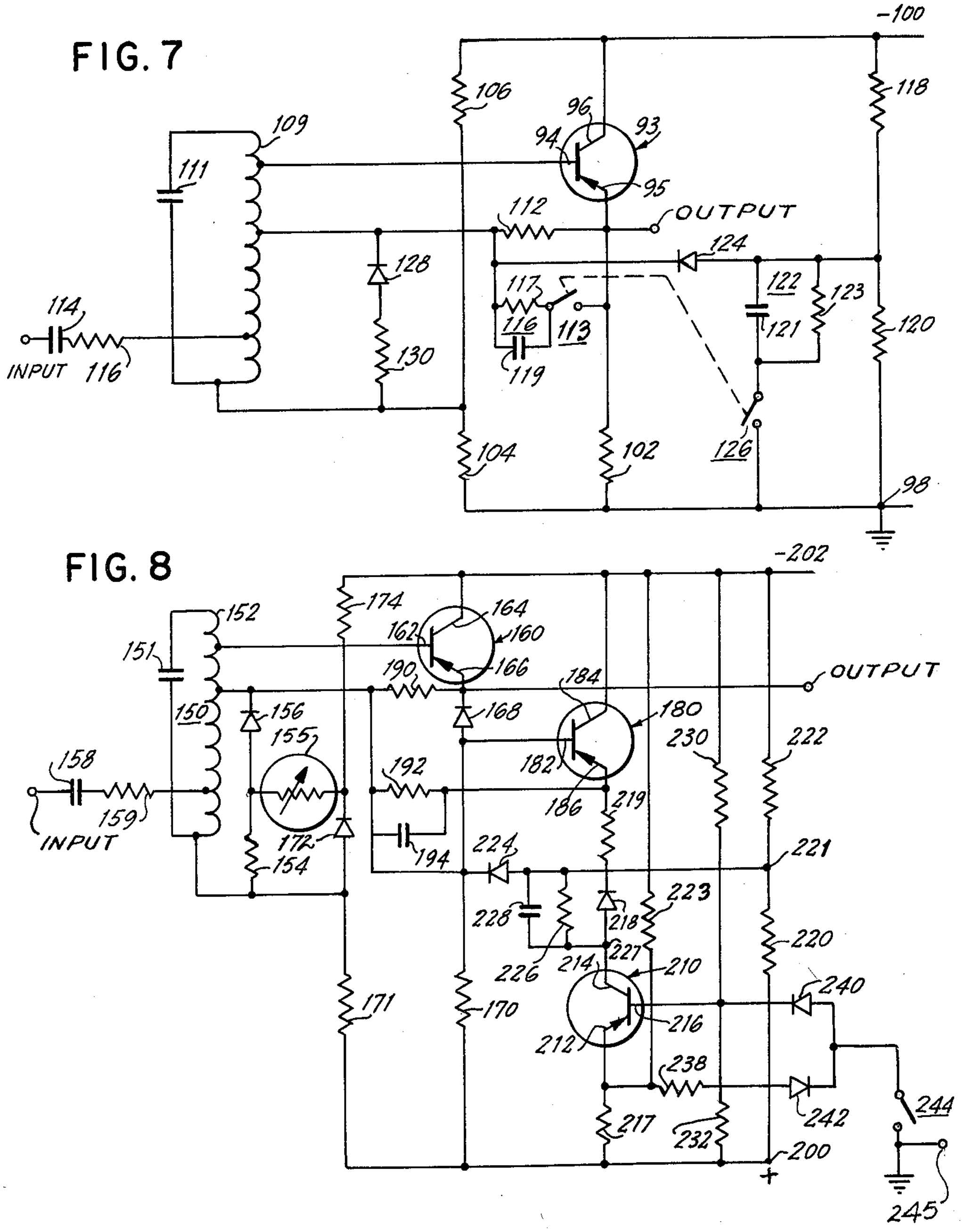

FIG. 3 is a schematic drawing of an embodiment of a Q multiplier circuit in accordance with the principles of the invention wherein the operating frequency is the same in both the selective amplifier and oscillator modes of operation and wherein when the circuit is operated in the oscillator mode of operation, the time required for the output voltage thereof to attain its final value is substantially decreased;

FIG. 4 is a diagram of a Q multiplier circuit in accordance with the invention wherein the output voltage of the circuit when it is operated as an oscillator is substantially constant, irrespective of any variations in the voltage supply therein and variations in operating characteristics of circuit components due to temperature changes;

FIG. 5 is a schematic drawing of a Q multiplier circuit in accordance with the invention capable of being operated in both the selective amplifier and oscillator modes of operation, wherein the operating frequency of the circuit is substantially the same in both modes of operation and wherein, when the circuit is operated as an oscillator, the output quickly attains its final voltage level, and such output voltage remains substantially constant irrespective of variations in the supply voltage and changes in temperature;

FIG. 6 is a schematic diagram of a Q multiplier circuit in accordance with the invention which is similar to the circuit of FIG. 4;

FIG. 7 is a schematic diagram of a Q multiplier circuit in accordance with the invention which is similar to the circuit of FIG. 5; and FIG. 8 is a schematic drawing of a circuit similar to the circuits of FIGS. 5 and 7 and further including keying means for switching the circuit from the selective amplifier to the oscillator mode of operation.

Figure 1:
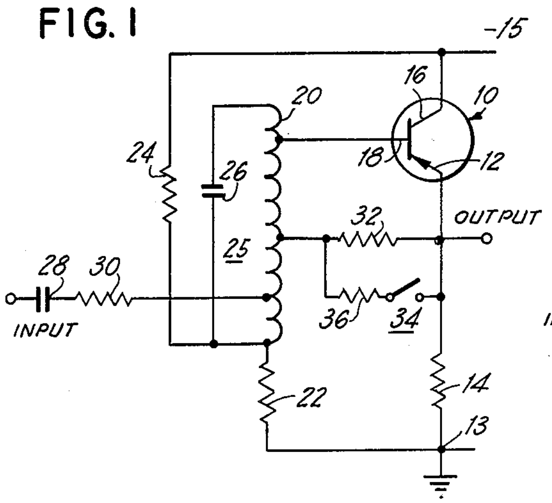
FIG. 1 is a schematic depiction of a known Q multiplier circuit adapted to be operated both in the selective amplifier and oscillator modes of operation.

Referring now to FIG. 1 there is shown therein a known Q multiplier circuit capable of being operated in both the selective amplifier and oscillator modes of operation. A transistor 10 is provided as the active element therein and includes an emitter electrode 12 connected through a resistor 14 to the common terminal 13 of a unidirectional potential source (not shown) a collector electrode 16 connected to the negative terminal 15 of the potential source and a base electrode 18 connected through an inductor 20 and a resistor 22 to common terminal 13, and through inductor 20 and a resistor 24 to negative terminal 15. Shunting inductor 20 is a capacitor 26, parallel combination 25 of capacitor 26 and inductor 20 providing a tank circuit having a characteristic resonant frequency. It is seen that transistor 10 is connected in the emitter follower arrangement. When the circuit is operated as a selective amplifier, the input thereto is to inductor 20 through series connected capacitor 28 and resistor 30 and the output is taken at emitter electrode 12. When the circuit is operated as an oscillator, the output is also taken at emitter electrode 12. Because of the emitter follower connection of the transistor, the feedback from emitter electrode 12 through resistor 32 to inductor 20 and base 18 is in the same phase as the voltage applied to base 18, i.e., it is regenerative. The presence of resistor 32 in the circuit serves to reduce the effective resistance of inductor 20, effectively multiplying the Q of tank circuit 25. To convert the circuit from selective amplifier to oscillator operation, a switch 34 is provided to insert a resistor 36 in parallel arrangement with resistor 32, the net resistance value of the parallel arrangement of resistance 32 and 36 being chosen to be low enough to provide sufficient regenerative feedback to drive the circuit into oscillation when the circuit functions as an oscillator, the feedback resistors 32 and 36 simultaneously serving to multiply the Q of tank circuit 25. In this circuit, when it is operated in the selective amplifier mode of operation, its operating frequency is higher than when it is operated in the oscillator mode of operation.

Figure 2:
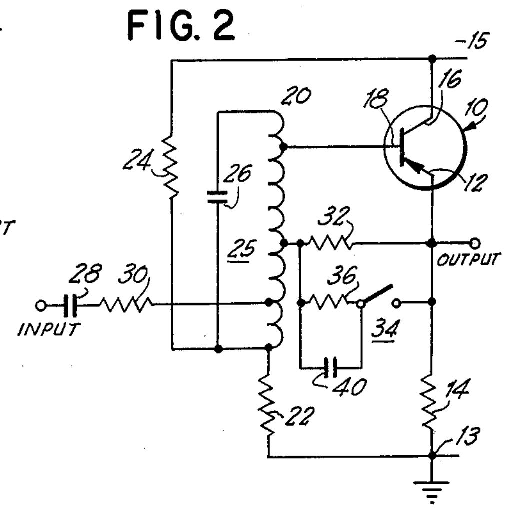
FIG. 2 is a schematic diagram of a Q multiplier circuit in accordance with the principles of the invention which is adapted to be utilized both in the selective amplifier and oscillator modes of operation wherein the frequency of each of such operations is the same.

To overcome this discrepancy in the operating frequencies during the different modes of operation, the circuit of FIG. 2 has been provided in accordance with the invention. This circuit is quite similar to the circuit of FIG. 1 and accordingly the same designating numerals have been applied to corresponding circuit components therein. In addition, the circuit of FIG. 2 has a capacitor 40 in shunt with resistor 36 whereby when switch 34 is closed, the parallel combination of resistor 36 and capacitor 40 is switched into parallel arrangement with resistor 32. With this circuit, the operating frequency of both modes of operation is the same. Such operating frequency is rendered substantially equal for both modes of operation by the additional capacitive reactance introduced by capacitor 40 in the circuit of FIG. 2 when the circuit is operated in the oscillator mode of operation. The required value for capacitor 40 varies inversely as the frequency of operation.

The circuit of FIG. 3 is a Q multiplier circuit in accordance with the invention which is adapted to be operated both as an oscillator and a selective amplifier wherein the operating frequencies are substantially the same in both of these modes of operation and wherein the time required for the output voltage of the circuit when it is operated as an oscillator to rise to its final value is appreciably reduced. This circuit is similar to the circuit depicted in FIG. 2 so that here again the same designating numerals as those of FIGS. 1 and 2 have been utilized for corresponding circuit components. The circuit of FIG. 3 further includes a voltage divider arrangement comprising resistors 42 and 44 connected between the terminals 13 and 15 of the voltage supply source and a diode 46 having its anode connected to the junction point 43 of resistors 42 and 44. Connected between the junction of the anode of diode 46 and junction point 43 and common terminal 13 of the voltage supply source is a series arrangement of a capacitor 48, and the rotor of a switch 50. The fixed pole of switch 50 being connected to common terminal 13. Connected across capacitor 48 is a resistor 52. As shown, switches 34 and 50 are ganged for simultaneous operation. The values of resistors 42 and 44 are so chosen that when switches 34 and 50 are open, the potential at the anode of diode 46 is negative with respect to the poential at its cathode and diode 46 is consequently non-conductive. Accordingly, there is no charge across capacitor 48 in this condition. When the switches are closed in the steady state condition, the potential at the cathode of diode 46 remains substantially the same and the value of resistor 52 is so chosen that the potential at anode of diode while less negative than the potential thereat, when the switches are open still is sufficiently negative with respect to the potential at cathode of diode 46 to maintain the latter in the non-conductive state. However, the instant that the switches are closed, capacitor 48 commences to charge very rapidly through resistor 42 momentarily rendering the anode of diode 46 more positive than its cathode whereby a pulse of current is introduced into the tank circuit 25. This current pulse shock excites tank circuit 25 into oscillation very quickly, and the Q multiplier circuit consequently attains its final voltage output level very rapidly when it is operated as an oscillator.

In FIG. 4, there is shown a Q multiplier circuit in accordance with the invention wherein the output voltage of the circuit when it is operated in the oscillator mode of operation is maintained relatively constant irrespective of variations in the voltage supply. The circuit comprises a transistor 60 connected in the emitter follower arrangement. Transistor 60 comprises a collector electrode 62 connected directly to the negative terminal 70 of the voltage supply source (not shown), an emitter electrode 64 connected to the common terminal 72 of the voltage supply source through a resistor 74 and a base electride 66 connected to a tank circuit 68 comprising parallel connected inductor 67 and capacitor 69. Connected between emitter electrode 64 and inductor 67 is a feedback resistor 76 for regeneratively feeding back a portion of the output appearing at emitter electrode 64 to inductor 67 to multiply the Q of tank circuit 68 to maintain it operative as a selective amplifier. A resistor 78 is provided which is adapted to be inserted into parallel arrangement with resistor 76 by the closing of a normally open switch 80. Connected between the common and negative terminals of the supply source is a series arrangement of a resistor 86, a diode 84 and a resistor 82, the anode of diode 84 being connected to resistor 86 and the cathode thereof being connected to resistor 82. A series arrangement of a resistor 88 and a diode 90 is connected across inductor 67 between the junction of inductor 67 and resistor 76 and the junction of inductor 67 and resistor 86, the anode of diode 90 being connecting to resistor 88 and its cathode being connected to the junction of inductor 67 and resistor 76. Connected between the junction 89 of diode 90 and resistor 88 and the junction of diode 84 and resistor 82 is a resistor 92 having a negative temperature coefficient, resistor 92 having a negative temperature coefficient, resistor 92 suitably being a thermistor. In considering the operation of FIG. 4 it is seen that diode 90 tapped across part of the tank circuit 68 may be inserted across all of the tank circuit. In the circuits of FIGS. 1, 2, and 3, the respective peak values of the output voltage is produced by the circuits in the oscillator mode of operation is limited at the positive extreme by transistor cutoff and at the negative extreme by transistor saturation. The peak to peak value of the oscillator output voltage is proportional to the supply voltage and varies as the supply voltage varies.

In the circuit of FIG. 4, when the voltage produced across diode 90 and resistor 88 in the oscillator mode of operation exceeds the conduction voltage of diode 90, diode 90 is in a conducting state during a portion of the cycle of this signal voltage. This conduction through diode 90 and resistor 88 removes energy from tank circuit 68 and holds the voltage across the tank circuit and therefore the oscillator output voltage at a value depending upon the value of resistor 88 and the characteristics of diode 90.

The input voltage as a selective amplifier is normally kept small enough so that diode 90 does not conduct at any time while the circuit is operated in the selective amplifier mode. However, the values of resistors 76 and 78 are so chosen that while the circuit of FIG. 4 is operated in the oscillator mode of operation, sufficient voltage is produced across inductor 67 to cause diode 90 to contact during a portion of the cycle of oscillator voltage.

Thus, with this arrangement, the variations in output voltage from the oscillator resulting from supply voltage variations is reduced and the output voltage is freed from dependence upon the transistor characteristics. Distortion in oscillator output is also reduced. In this circuit where diode 90 is chosen to be a semi-conductor device having a germanium or silicon semiconductor body, the operating characteristics thereof may vary with temperature so that thermistor 92, resistor 88 and diode 84 are provided to compensate for variations in operating characteristics of diode 90 in response to changes in temperature. Accordingly, in the event of temperature change where the temperature is in the negative direction, the resistance of thermistor 92 rises since it has a negative temperature coefficient and the voltage at junction point 89 becomes more positive. When the temperature rises, the resistance of thermistor 92 decreases and the voltage at junction point 89 becomes more negative. When the circuit is utilized as a selective amplifier, the input is applied thereto through series connected capacitor 87 and resistor 91.

In FIG. 5, there is shown a Q multiplier circuit in accordance with the invention and embodying the features included in the circuits of FIGS. 2, 3, and 4. The transistor 93 therein comprises an emitter electrode 95, a base electrode 94 and a collector electrode 96. Biasing potentials are applied from the common terminal 98 and the negative terminal 100 of the voltage supply source (not shown) to the transistor electrodes through respective resistors 102, 104 and 106. A tank circuit 108 comprising a parallel connected inductor 109 and a capacitor 111 is in circuit with the input of transistor 93 and resistor 112 is connected between emitter electrode 95 and inductor 109 to provide the degree of regenerative feedback required to render the circuit in the selective amplifier mode of operation, when an input is applied to the circuit through series connected capacitor 114 and resistor 116, the output being taken at emitter electrode 95. A switch 113 is included to insert the parallel combination 116 of a resistor 117 and a capacitor 119 into parallel arrangement with resistor 112 whereby the resistance between emitter electrode 95 and inductor 109 is decreased to the point that an amount of regenerative feedback is attained which causes the circuit to operate as an oscillator. Q multiplication is of course effected in both the selective amplifier and oscillator modes of operation. The value of capacitor 119 is so chosen that the frequency in both modes of operation is substantially the same as hereinabove previously explained.

The voltage divider arrangement comprising resistors 118 and 120 together with the parallel combination 122 of capacitor 121 and resistor 123, diode 124 and normally open switch 126, ganged with switch 113 to operate simultaneously therewith comprise the means for quickly shock-exciting tank circuit 108 into oscillation when switches 113 and 126 are closed. Diode 128 and resistor 130 serve to compensate for variations in the supply voltage whereby the output voltage in the oscillator mode of operation of the circuit is maintained substantially constant despite such variations and thermistor 132, diode 134 and resistor 130 serve to compensate for variations in the operating characteristics of diode 128 due to temperature changes in the event that diode 128 is of the semiconductor type.

The circuit of FIG. 6 is similar to the circuit of FIG. 4, the difference being that resistor 92, i.e., the thermistor and diode 84 have not been included. While the circuit of FIG. 6 may not be as completely effective as the circuit of FIG. 4 in compensating for operating temperature changes when dode 90 is of the semiconductor type, it has been found that the circuit of FIG. 6 is sufficiently stable in response to normal variations of temperature so that where very fine temperature compensation is not required, the additional cost imposed by the use of a thermistor and a diode may be eliminated.

FIG. 7 is a circuit according to the invention which is similar to the circuit of FIG. 5 the difference being that in the circuit of FIG. 7, diode 134 and thermistor 132 are not included for the same reasons as for not including the corresponding devices in the circuit of FIG. 6. The circuit of FIG. 7 otherwise embodies the features shown in the circuits of FIGS. 2, 3 and 6.

In the circuit of FIG. 8 there is depicted a Q multiplier circuit in accordance with the invention wherein the double pole single throw switch utilized to switch the circuit from amplifier to oscillator operation and the consequent disadvantages ensuing from the use thereof, as detailed above, is replaced by a simple single pole switch with one contact externally grounded. The external grounding may be either the positive or negative side of the supply voltage so that the circuit can be adapted to a positive or negative ground system equally easily.

In the circuit of FIG. 8 similar to the circuits depicted in FIGS. 2 through 7, a tank circuit 150 having a characteristic resonating frequency and comprising a parallel combination of an inductor 152 and a capacitor 151 is connected from a point on its inductor 152 to the base electrode 162 of a transistor 160. Transistor 160 is connected in emitter follower arrangement; its collector electrode 164 is directly connected to the negative terminal 202 of a voltage supply source (not shown) and its emitter electrode 166 is connected through the cathode to anode path of a diode 168 and a resistor 170 to the positive terminal 200 of the supply source. Connected across a portion of inductor 152 is a series arrangement of a resistor 154 and a diode 156. Connected between the positive terminal 200 and the negative terminal 202 of the supply source is a series arrangement of a resistor 171, a diode 172 and a resistor 174. Connected between the junction of the anode of diode 156 and resistor 154 and the junction of the cathode of diode 172 and resistor 174 is a thermistor 155.

The anode of diode 168 is connected to the base electrode 182 of a transistor 180. Transistor 180 is also connected in the emitter follower arrangement and has a collector electrode 184 directly connected to the negative terminal 202 of the supply source. The emitter electrode 186 of transistor 180 is connected to the junction of the cathode of diode 156 and selective amplifier feedback resistor 190 through oscillator feedback resistor 192, resistor 192 being shunted by a capacitor 194. The output of the circuit is taken from emitter electrode 166 and the input thereto when it is utilized in the selective amplifier mode of operation, is to inductor 152 through series connected capacitor 158 and resistor 159.

A transistor 210 has its emitter electrode 212 connected to the positive terminal 200 of the supply source through a resistor 217 and its collector electrode 214 connected through the anode to cathode path of a diode 218, and a resistor 219 to emitter electrode 186 of transistor 180. Emitter electrode 212 is also connected to terminal 202 through a resistor 223.

Connected across the supply source is a voltage divider arrangement comprising a resistor 220 and a resistor 222, the junction 221 therebetween being connected through the anode to cathode path of a diode 224 to the junction of resistor 190 and the cathode of diode 156.

Connected between the junction of the anode of diode 224 and junction point 221, and collector electrode 214 is a parallel combination of a resistor 226 shunted by a capacitor 228. The base electrode 216 of transistor 210 is connected to the junction of resistors 230 and 232 connected across the supply source.

Base electrode 216 is connected through the cathode to anode path of a diode 240 and emitter electrode 212 is connected through a resistor 238 and through the anode to cathode path of a diode 242 to the movable contact of a single pole switch 244, the fixed pole of switch 244, being connected to ground.

It is seen that the circuit of FIG. 8, with respect to Q multiplier operation in both the selector amplifier and oscillator modes of operation, includes capacitor 194 in shunt with resistor 192 for rendering the frequency of operation of the circuit the same in both modes of operation. The presence of resistor 226, capacitor 228 and diode 224 serve to shock excite tank circuit 150 into oscillation when it is switched to the oscillator mode of operation and the inclusion of diodes 156 and 172, thermistor 155 and resistor 154 serve to compensate for variations in the voltage supply and for changes in the operating characteristics of diode 156 due to temperature changes in the event that diode 156 is of the semiconductor type.

Considering now the operation of the switching mechanism of the circuit of FIG. 8, when switch 244 is open, the values of the circuit components are chosen so that the circuit operates in the oscillator mode of operation. In such oscillator mode of operation, transistor 210 conducts due to the values chosen for resistors 230, 232, 223 and 217. The values of the circuit components are also so chosen that when transistor 210 is conductive, the potential at the anode of diode 218 is less negative with respect to the potential at the cathode thereof and consequently, it also conducts. The emitter electrode 186 of transistor 180 is thereby connected to the positive terminal of the supply source through resistor 219, diode 218, transistor 210 and resistor 217 whereby transistor 180 conducts and operates as an emitter follower. Consequently a low impedance is established between emitter electrode 186 and base electrode 182. Diode 168 is always conductive to present a low impedance to base electrode 182 and emitter electrode 166. With both transistors 160 and 180 in the conductive state, regenerative feedback is applied to inductor 152 through the parallel arrangement of resistor 190 and the parallel combination of resistor 192 and capacitor 194. Accordingly, the function of switch 113 as depicted in the circuits of FIGS. 5 and 7 for example is performed by the operation of transistor 180 in connecting emitter electrode 186 to emitter electrode 166 through diode 168. The function of switch 126 as shown in FIGS. 5 and 7 for example is performed by the operation of transistor 210 in connecting junction point 227 to the positive terminal of the supply source through resistor 217.

Let it now be assumed that point 245 is connected to the positive terminal 200 of the supply source and that single pole switch 244 is closed. Base electrode 216 is thereby connected to ground (positive terminal of the supply source) through diode 240 and thus is placed at a potential which is less negative than that of emitter electrode 212. Transistor 210 is thus rendered nonconductive. Consequently the anode of diode 218 becomes negative with respect to the cathode thereof and with the circuit values as chosen as explained hereinabove diode 218 is rendered cut off. Emitter electrode 186 therefore is disconnected from ground to cutoff transistor 180 and there is no feedback from emitter electrode 186 through the parallel combination of resistor 192 and capacitor 194 to inductor 152. Transistor 160 remains conductive because of its normal biasing arrangements through resistors 170, 171 and 174 and diode 172 and regenerative feedback is supplied to inductor 152 through resistor 190 whereby the circuit functions a Q multiplier circuit in the selective amplifier mode of operation. In this situation, since diode 168 is always conductive, there is assured a sufficient reverse bias across the emitter electrode to base electrode junction of transistor 180 to render transistor 180 non-conductive when transistor 210 is cut off. Thus, one function of switch 113 is performed by transistor 180 and diode 218 in disconnecting emitter electrode 186 from the circuit and the function of switch 126 is performed by transistor 210 by disconnecting junction point 227 from the circuit.

Let it now be assumed that point 245 is connected to the negative terminal of the supply source and that single pole switch 244 is closed. Emitter electrode 212 is thereby connected to ground (negative terminal of the supply source) through diode 242 and resistor 238, and thus is placed at a potential which is less positive than that of base electrode 216. Transistor 210 is thus rendered non-conductive. The other circuit elements operate as described above when transistor 210 is rendered non-conductive.

In all the circuits shown above the transistors utilized therein have been junction transistors of the PNP conductivity type. It is of course to be understood that junction transistors of the NPN conductivity type can be equally utilized, there merely being required a reversal of the biasing potentials in the circuits. Also, in the circuit of FIG. 8 similar to the circuits of FIGS. 6 and 7, thermistor 155 and diode 172 need not be included if precise temperature compensation is not a factor.

While there have been shown particular embodiments of this invention, it will, of course, be understood, that it is not wished to be limited thereto since different modifications may be made both in the circuit arrangements and the instrumentalities employed, and it is contemplated in the appended claims to cover any such modifications as fall within the true spirit and scope of the invention.

What is claimed as new and desired to be secured by Letters Patent of the United States is:

1. In a Q multiplier circuit including an active device having an input and an output and a tank circuit in circuit with said input; means for selectively regeneratively feeding back a first portion of said output to said tank circuit to provide Q multiplication of said tank circuit, said first portion having a value whereby said Q multiplier circuit functions as a selective amplifier and for regeneratively feeding back a second portion of said output to said tank circuit to provide Q multiplication of said tank circuit, said second portion having a value whereby said Q multiplier functions as an oscillator, said means comprising a first resistance connected between said output and said tank circuit for feeding back said first portion, a parallel combination of a capacitance and a second resistance, and means for selectively inserting said parallel combination into parallel arrangement with said first resistance for feeding back said second portion from said output to said tank circuit, the value of said capacitance being so chosen whereby the operating frequencies in both of said functionings is substantially the same.

2. In a Q multiplier circuit comprising a transistor having an input, an output and a tank circuit in circuit with said input; a first resistance connected between said output and said tank circuit for regeneratively feeding back a portion of said output to said tank circuit to multiply the Q of said tank circuit, said first portion being so chosen whereby said Q multiplier circuit functions in the selective amplifier mode of operation, a parallel combination of a capacitance and a second resistance, switching means to selectively insert said parallel combination into parallel arrangement with said first resistance, said parallel arrangement functioning to regeneratively feed back a second portion of said output to said tank circuit to multiply the Q of said tank circuit, the value of said second portion being so chosen whereby said Q multiplier functions in the oscillator mode of operation, the value of said capacitance being so chosen whereby the operating frequencies of both said modes of operation is substantially the same.

3. A Q multiplier circuit capable of operating in both the selective amplifier and oscillator modes of operation comprising a transistor having emitter, base and collector electrodes, a tank circuit in circuit with said base electrode, a first resistance connected between said transistor and said tank circuit for regeneratively feeding back a portion of the output of said transistor to said tank circuit to multiply the Q of said tank circuit, the value of said first resistance being so chosen whereby said Q multiplier circuit functions in the selective amplifier mode of operation, a parallel combination of a capacitance and a second resistance, switching means for selectively inserting said parallel combination into parallel arrangement with said first resistance, said parallel arrangement serving to regeneratively feed back a second portion of the output of said transistor, the value of the resistance of said parallel arrangement being so chosen whereby said second portion causes said Q multiplier circuit to function in the oscillator mode of operation, the value of said capacitance being so chosen whereby the operating frequencies in each of said respective modes of operation are substantially the same.

4. A Q multiplier circuit comprising a transistor connected in the emitter follower configuration and comprising emitter, base, and collector electrodes, a tank circuit in circuit with said base electrode, a first resistance connected between said emitter and said tank circuit for regeneratively feeding back a portion of the output of said emitter to said tank circuit to multiply the Q of said tank circuit, the value of said first resistance being so chosen whereby said Q multiplier circuit functions in the selective amplifier mode of operation, a parallel combination of a capacitance and a second resistance, switching means for selectively inserting said parallel combination into parallel arrangement with said first resistance, said parallel arrangement serving to regeneratively feed back a second portion of the output of said emitter to said tank circuit, the value of the resistance of said parallel arrangement being so chosen whereby said second portion causes said Q multiplier circuit to function in the oscillator mode of operation, the value of said capacitance being so chosen whereby the operating frequencies in each of said respective modes of operation are substantially the same.

5. In a Q multiplier circuit including an active device having an input and an output, a tank circuit in circuit with said input, means for selectively regeneratively feeding back a first portion of said output to said tank circuit to provide Q multiplication of said tank circuit, said first portion having a value whereby said Q multiplier circuit is enabled to function as a selective amplifier, and for regeneratively feeding back a second portion of said output to said tank circuit to provide Q multiplication of said tank circuit, the value of said second portion being so chosen whereby said Q multiplier circuit is enabled to function in the oscillator mode of operation, means for rapidly providing an initial current pulse and means for selectively inserting said last named means into circuit with said tank circuit simultaneously with the feeding back thereto of said second portion to shock excite, rapidly, said tank circuit into oscillation whereby when said Q multiplier circuit is in the oscillator mode of operation, the final voltage level of its output is relatively rapidly attained.

6. A Q multiplier capable of functioning both in the selective amplifier and oscillator modes of operation and at substantially the same respective operating frequencies comprising a transistor having an input and an output, a tank circuit in circuit with said input, a first resistance connected between said output and said tank circuit for regeneratively feeding back a first portion of said output to said tank circuit to cause said Q multiplier circuit to function as a selective amplifier, a parallel combination of a capacitance and a second resistance, means for selectively inserting said parallel combination into parallel arrangement with said first resistance, the value of the resistance of said parallel arrangement being chosen whereby a second portion is fed back from said output to said tank circuit to cause said Q multiplier circuit to function as an oscillator, the value of said capacitance being so chosen whereby the operating frequencies in both of said functions are substantially the same, and means for selectively shock exciting said tank circuit into oscillation simultaneously with the insertion into parallel arrangement of said parallel combination with said first resistance.

7. A Q multiplier circuit capable of functioning both in the selective amplifier and oscillator modes of operation comprising a transistor having emitter, base, and collector electrodes, a tank circuit in circuit with said base, means for regeneratively feeding back a first portion of the output of said transistor to said tank circuit to multiply the Q of said tank circuit, said first portion being so chosen whereby said Q multiplier circuit functions in the selective amplifier mode of operation and for regeneratively feeding back a second portion of the output of said transistor to said tank circuit to multiply the Q of said tank circuit, said second portion being so chosen whereby said Q multiplier circuit functions in the oscillator mode of operation, a capacitance in circuit with said feedback means when said second portion is fed back and having a value whereby the operating frequencies in both of said respective modes of operation is substantially the same, and means for selectively rapidly shock exciting said tank circuit into oscillation simultaneously with the rendering of said Q multiplier circuit in the oscillator mode of operation.

8. A Q multiplier circuit capable of functioning in both the amplifier and oscillator modes of operation comprising a transistor having emitter, base and collector electrodes, a source of unidirectional potential, means for applying biasing potentials to said electrodes from said source to connect said transistor in the emitter follower configuration, a tank circuit comprising a parallel combination of an inductance and a first capacitance in circuit with said base electrode, a first resistance connected between the emitter of said transistor and said inductance for regeneratively feeding back a portion of the output of said transistor to said inductance to multiply the Q of said tank circuit, the value of said first resistance being so chosen whereby the amount of said fed back output causes said Q multiplier circuit to operate in the selective amplifier mode of operation, a parallel combination of a second capacitance and a second resistance, means for selectively inserting said parallel combination into parallel arrangement with said first resistance, the value of the resistance of said parallel arrangement being so chosen whereby the portion of the output of said transistor fed back therethrough to said inductance causes said Q multiplier circuit to operate in the oscillator mode of operation, the value of said second capacitance being so chosen whereby the frequency of operation of both of said modes is substantially the same, unidirectional conducting means connected between said inductance and said potential source, means for applying biasing potentials to said unidirectional conducting means whereby it is normally non-conductive, a parallel combination of a third resistance and a third capacitance, switching means for selectively inserting said parallel combination of said third resistance and said third capacitance into circuit between said unidirectional conducting means and said potential source simultaneously with the insertion of said parrallel combination into circuit with said first resistance to provide an initial pulse to said inductance from said third capacitance through said unidirectional conducting means to rapidly shock excite said tank circuit into oscillation.

9. A Q multiplier circuit comprising a transistor having an input and an output, said transistor having emitter base and collector electrodes, a source of unidirectional potential, means for applying biasing potentials to said transistor electrodes from said source, a tank circuit in circuit with said input, means for regeneratively feeding back a first portion of the output of said transistor to said tank circuit to multiply the Q of said tank circuit, said first portion having a value whereby said Q multiplier circuit functions as a selective amplifier and for regeneratively feeding back a second portion of said output to provide Q multiplication of said tank circuit, the second portion having a value whereby said Q multiplier circuit functions as an oscillator, said means comprising a first resistance having a first chosen value connected between said output and said tank circuit, a second resistance and switching means for selectively inserting said second resistance into parallel combination with said first resistance, and means in said Q multiplier circuit for maintaining a constant value of oscillation output voltage irrespective of variations in the value of voltage from said source.

10. A Q multiplier as defined in claim 9 and further including means responsive to temperature variations for compensating for said temperature variations.

11. A Q multiplier circuit capable of functioning both in the selective amplifier and oscillator modes of operation comprising a transistor having emitter, base and collector electrodes, a source of unidirectional potential, means for applying biasing potentials to said electrodes from said source to place said transistor in the emitter follower configuration, a tank circuit comprising a parallel combination of an inductance and a capacitance in circuit with said base electrode, a first resistance connected between said emitter and said inductance for regeneratively feeding back a portion of the output of said transistor to said tank circuit to multiply the Q of said tank circuit, the value of said first resistance being so chosen whereby the amount of said portion maintains said Q multiplier circuit in the selective amplifier mode of operation, a second resistance, means for selectively inserting said second resistance into parallel arrangement with said first resistance, the resistance value of said parallel arrangement being so chosen whereby the portion of the output of said transistor fed back from said emitter electrode to said inductance through said parallel combination causes said Q multiplier circuit to operate in the oscillator mode of operation, first unidirectional conducting means connected in shunt with said inductance to effect a constant value of oscillator output voltage despite variations in voltage from said potential source, second unidirectional conducting means and a resistance having a negative temperature coefficient connecting said first and second unidirectional conducting means in series arrangement whereby variations in said oscillator output voltage caused by variations of said first unidirectional conducting means due to variations in temperature are compensated for.

12. A Q multiplier circuit capable of functioning in the selective amplifier and oscillator modes of operation comprising a transistor having emitter, base and collector electrodes, a source of unidirectional potential, means for applying biasing potentials to said electrodes from said source to place said transistor in the emitter follower configuration, a tank circuit comprising a parallel combination of an inductance and a capacitance in circuit with said base electrode, a first resistance connected between said emitter and said inductance, said first resistance having a value which is so chosen whereby a portion of the output of said transistor is regeneratively fed back to said inductance to multiply the Q of said tank circuit, said portion having a value to cause said Q multiplier circuit to function in the selective amplifier mode of operation, a parallel combination of a second capacitance and a second resistance, means for selectively inserting said parallel combination into parallel arrangement with said first resistance, the resistance of said parallel combination being so chosen whereby the portion of the output of said transistor fed back from said emitter to said inductance through said parallel arrangement multiplies the Q of said tank circuit and causes said Q multiplier circuit to function in the oscillator mode of operation, the value of said second capacitance being so chosen whereby the respective operating frequencies of said Q multiplier circuit in both of said modes of operation is substantially the same, first unidirectional conducting means connected between said inductance and said potential source, means for applying biasing potentials to said first unidirectional conducting means from said source to normally maintain said first unidirectional conducting means in the non-conductive state, a second parallel combination of a third resistance and a third capacitance, means for selectively inserting said second parallel combination in circuit between said first unidirectional conducting means and said source simultaneously with the insertion of said first parallel combination into parallel arrangement with said first resistance to rapidly shock excite said tank circuit into oscillation, second unidirectional conducting means connected across said inductance such that a relatively constant value of oscillator output voltage is maintained despite variations in voltage from said potential source.

13. A Q multiplier circuit capable of functioning in the selective amplifier and oscillator modes of operation comprising a transistor having emitter, base and collector electrodes, a source of unidirectional potential, means for applying biasing potentials to said electrodes from said source to place said transistor in the emitter follower configuration, a tank circuit comprising a parallel combination of an inductance and a first capacitance in circuit with said base electrode, a first resistance connected between said emitter and said inductance, said first resistance having a value which is so chosen whereby a portion of the output of said transistor is regeneratively fed back to said inductance to multiply the Q of said tank circuit, said portion having a value to cause said Q multiplier circuit to function in the selective amplifier mode of operation, a parallel combination of a second capacitance and a second resistance, means for selectively inserting said parallel combination into parallel arrangement with said first resistance, the resistance of said parallel combination being so chosen whereby the portion of the output of said transistor fed back from said emitter to said inductance through said parallel arrangement multiplies the Q of said tank circuit and causes said Q multiplier circuit to function in the oscillator mode of operation, the value of said second capacitance being so chosen whereby the respective operating frequencies of said Q multiplier circuit in both of said modes of operation is substantially the same, first unidirectional conducting means connected between said inductance and said potential source, means for applying biasing potentials to said unidirectional conducting means from said source to normally maintain said first unidirectional conducting means in the non-conductive state, a second parallel combination of a third resistance and a third capacitance, means for selectively inserting said second parallel combination in circuit between said first unidirectional conducting means and said source simultaneously with the insertion of said first parallel combination, into parallel arrangement with said first resistance to rapidly shock excite said tank circuit into oscillation, second unidirectional conducting means connected across said inductance such that a constant value of oscillator output voltage is maintained despite variations in voltage from said potential source, third unidirectional conducting means, a fourth resistance having a negative temperature coefficient connecting said second and third unidirectional conducting means in series whereby variations in said oscillator output voltage caused by changes in said second unidirectional conducting means due to variations in temperature are compensated for.

14. A Q multiplier circuit capable of functioning as both an amplifier and oscillator comprising a first transistor having an input and an output and having emitter, base and collector electrodes, a source of unidirectional potential, means for applying biasing potentials from said source to said first transistor electrodes to place said transistor in the emitter follower configuration, and to normally maintain said first transistor in the conductive state, a tank circuit comprising a parallel arrangement of a first capacitance and an inductance, a first resistance connected between the output of said transistor and said inductance for regeneratively feeding back a portion of said output to said tank circuit to multiply the Q of said tank circuit, said first resistance being so chosen whereby the value of said portion fed back causes said circuit to operate in the selective amplifier mode of operation, a second transistor having an input and an output and comprising second emitter, base and collector electrodes, first means for applying the output of said first transistor as an input to said second transistor, a parallel combination of a second resistance and a second capacitance connected between the output of said second transistor and said inductance to provide a parallel arrangement of said first resistance and said second parallel combination, the value of the resistance of said parallel arrangement being so chosen whereby when both said first and said second transistors are in the conductive state, the portions of the outputs of said first and second transistors fed back to said tank circuit through said parallel arrangement multiplies the Q of said tank circuit and causes said Q multiplier circuit to function as an oscillator, a third transistor comprising third emitter, base and collector electrodes, means for applying biasing potentials to said third transistor from said source to normally maintain said third transistor in the conductive state, second means for applying the output of said third transistor to said second transistor to place said second transistor in the emitter follower configuration and switching means for selectively biasing said third transistor to cutoff to simultaneously cut off said second transistor whereby the regenerative feed back to said tank circuit is through said first resistance and said Q multiplier circuit functions in the selective amplifier mode of operation.

15. A Q multiplier circuit as defined in claim 14 wherein said first means comprises a first diode having its cathode coupled to said first emitter electrode and its anode coupled to said second base electrode and said second means comprises a second diode having its cathode coupled to said second emitter electrode and its anode coupled to said third collector electrode.

16. A Q multiplier circuit as defined in claim 15 and further including means for rapidly shock exciting said tank circuit into oscillation simultaneous with the switching by said switching means of said third transistor from the non-conductive to the conductive state.

17. A Q multiplier circuit as defined in claim 16 and further including means in circuit with said tank circuit for varying the impedance across said tank circuit in response to variation in voltage from said potential source to compensate for said voltage variation.

18. A Q multiplier circuit as defined in claim 17 and further including means in circuit with said tank circuit for compensating for temperature variations, said means including a resistance having a negative temperatcre coefficient.

19. A circuit as defined in claim 18 wherein said switching means includes means for adapting said transistor to be selectively cut off either by application of a first potential to asid third emitter electrode or a second potential to said third base electrode.

References Cited in the file of this patent

UNITED STATES PATENTS

| | | |
|---|---|---|
| 2,791,693 | Moore | May 7, 1957 |
| 2,825,810 | Zeidler | Mar. 4, 1958 |